(12) United States Patent
Doege et al.

(10) Patent No.: US 8,597,811 B2
(45) Date of Patent: Dec. 3, 2013

(54) RECHARGEABLE BATTERY INCLUDING BATTERY CELLS WITH CASINGS HAVING DIFFERENT WALL THICKNESSES

(75) Inventors: Volker Doege, Dischingen (DE); Stephan Leuthner, Leonberg (DE); Martin Holger Koenigsmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 942 days.

(21) Appl. No.: 12/488,736

(22) Filed: Jun. 22, 2009

(65) Prior Publication Data
US 2010/0028765 A1 Feb. 4, 2010

(30) Foreign Application Priority Data

Jul. 29, 2008 (DE) .......................... 10 2008 040 811

(51) Int. Cl.
*H01M 10/50* (2006.01)
*H01M 2/02* (2006.01)

(52) U.S. Cl.
USPC ........... 429/120; 429/148; 429/149; 429/163; 29/623.1; 29/623.5

(58) Field of Classification Search
None
See application file for complete search history.

(56) References Cited

U.S. PATENT DOCUMENTS

| 6,692,864 B1 * | 2/2004 | Dansui et al. ................. 429/120 |
| 2007/0218353 A1 * | 9/2007 | Straubel et al. ............... 429/120 |

FOREIGN PATENT DOCUMENTS

| JP | 2004-47208 | 2/2004 |
| JP | 2004-355861 | 12/2004 |
| JP | 2005-317455 | 11/2005 |
| JP | 2006-196230 | 7/2006 |

* cited by examiner

*Primary Examiner* — Kwang Han
(74) *Attorney, Agent, or Firm* — Michael J. Striker

(57) ABSTRACT

A rechargeable battery has a plurality of rechargeable battery cells which are situated in an interspaced manner in a rechargeable battery housing filled at least partially with a filler material which encloses the rechargeable battery cells, with a first rechargeable battery cell including a first casing, and a second rechargeable battery cell including a second casing, such that the first casing and the second casing having different wall thicknesses, at least in sections.

7 Claims, 2 Drawing Sheets

RECHARGEABLE BATTERY INCLUDING BATTERY CELLS WITH CASINGS HAVING DIFFERENT WALL THICKNESSES

CROSS-REFERENCE TO RELATED APPLICATION

The invention described and claimed hereinbelow is also described in German Patent Application DE 10 2008 040 811.5 filed on Jul. 29, 2008. This German Patent Application, whose subject matter is incorporated here by reference, provides the basis for a claim of priority of invention under 35 U.S.C. 119(a)-(d).

BACKGROUND OF THE INVENTION

The present invention relates to a rechargeable battery that includes a plurality of rechargeable battery cells which are situated in an interspaced manner in a rechargeable battery housing which is filled at least partially with a filler material which encloses the rechargeable battery cells.

Rechargeable batteries of this type are composed of individual rechargeable battery cells which are interconnected to form packs or modules, and are therefore often referred to as rechargeable battery packs or rechargeable battery modules. In these rechargeable batteries or rechargeable battery packs or rechargeable battery modules, the individual rechargeable battery cells are usually situated in a symmetrical configuration in a rechargeable battery housing which is typically filled with plastic. The plastic encloses the rechargeable battery cells which generate heat as a result of a temperature rise that takes place during the charge and discharge operations as a result of current flow; this heat is capable of impairing the functionality of the rechargeable batteries. This heat is dissipated from the interior of the rechargeable battery to the surroundings via the plastic casings, in order to prevent the rechargeable battery cells and, therefore, the rechargeable battery, from becoming overheated.

The disadvantage of the related art is that the rechargeable battery cells situated around the center of the rechargeable battery housing, and rechargeable battery cells having a larger number of adjacent cells usually heat up to a greater extent due to poorer heat dissipation than do the cells situated at the edge of the housing or than do cells having fewer adjacent cells. The result is an inhomogeneous temperature distribution in the rechargeable battery housing; the rechargeable battery cells that heat up to a greater extent age to a greater extent and more rapidly than do the cells that heat up to a lesser extent. As the number of charge and discharge cycles increases, the result is premature ageing of the rechargeable battery cells that were heated to a greater extent, up to the point at which one of these cells becomes defective prematurely, thereby rendering the rechargeable battery unusable and shortening the service life of the rechargeable battery. In addition, the individual rechargeable battery cells heat one another up during the charge and discharge operations. In the case of rechargeable battery cells in particular that have a relatively large number of directly-adjacent rechargeable battery cells, this may result in local overheating of the rechargeable battery, which may render it unsafe to operate.

SUMMARY OF THE INVENTION

One object of the present invention, therefore, is to provide a new rechargeable battery or rechargeable battery pack or rechargeable battery module having improved thermomanagement, in the case of which the service life is extended and operational safety is increased.

This aim is achieved via a rechargeable battery that includes a plurality of rechargeable battery cells which are situated in an interspaced manner in a rechargeable battery housing which is filled at least partially with a filler material which encloses the rechargeable battery cells. A first rechargeable battery cell includes a first casing, and a second rechargeable battery cell includes a second casing, the first casing and the second casing having different wall thicknesses, at least in sections.

The present invention therefore makes it possible to reduce the heating-up of selected rechargeable battery cells caused by adjacent rechargeable battery cells during operation of the rechargeable battery, by increasing the thickness of the walls they share with adjacent cells, thereby improving the heat dissipation from these cells.

According to one embodiment, the first and second casings are designed to bring about an essentially homogeneous temperature distribution in the interior of the rechargeable battery housing during operation of the rechargeable battery.

It is therefore possible to attain improved thermomanagement during operation of the rechargeable battery, thereby extending the service life of the rechargeable battery and increasing the operational safety.

According to one embodiment in which the first rechargeable battery cell has more directly-adjacent rechargeable battery cells than does the second rechargeable battery cell, the first casing has, in the region between the first rechargeable battery cell and at least a portion of the rechargeable battery cells directly adjacent thereto, a greater wall thickness than does the second casing in the region between the second rechargeable battery cell and the rechargeable battery cells located directly adjacent thereto.

It is therefore possible for rechargeable battery cells that have a relatively large number of rechargeable battery cells located directly adjacent to them to be situated further away from their directly-adjacent rechargeable battery cells than is the case with rechargeable battery cells having relatively few directly-adjacent rechargeable battery cells, thereby making it possible to attain a more homogeneous temperature distribution in the rechargeable battery.

If, in this embodiment, the rechargeable battery housing includes an outer housing wall, and the second rechargeable battery cell is located in the region of the outer housing wall, then the second casing includes a ridge-like expansion in the region between the second rechargeable battery cell and the outer housing wall.

This makes it possible to prevent excessive cooling of the second rechargeable battery cell during operation of the rechargeable battery.

If the first rechargeable battery cell is also located in the region of the outer housing wall, then the first casing has a smaller wall thickness in the region between the first rechargeable battery and the outer housing wall than does the ridge-like expansion.

The heat that is generated by the first rechargeable battery cell may therefore be dissipated more rapidly to the surroundings via the outer housing wall than is the case with the heat that is generated by the second rechargeable battery cell.

According to an embodiment in which the rechargeable battery housing includes an outer housing wall, and the first and second rechargeable battery cells are located in the region of the outer housing wall, the first rechargeable battery cell has a greater number of directly-adjacent rechargeable battery cells than does the second rechargeable battery cell, the second casing has a ridge-like expansion in the region between the second rechargeable battery cell and the outer housing wall, and the first casing has a smaller wall thickness in the region between the first rechargeable battery cell and the outer housing wall than does the ridge-like expansion.

The present therefore results in improved thermomanagement even in the case of a rechargeable battery in which the rechargeable battery cells are situated essentially equidistantly from adjacent rechargeable battery cells, the improved thermomanagement making it possible to dissipate the heat generated by the rechargeable battery cells having a relatively large number of directly-adjacent rechargeable battery cells via the outer housing wall to the surroundings more rapidly than is the case with the heat that is generated by the rechargeable battery cells having relatively few directly-adjacent rechargeable battery cells. It is therefore possible to attain a more homogeneous temperature distribution in the case of this rechargeable battery as well.

Plastic is used preferably as the filler material.

The aim described initially is also achieved via a power tool that includes a rechargeable battery that includes a plurality of rechargeable battery cells which are situated in an interspaced manner in a rechargeable battery housing which is filled at least partially with a filler material which encloses the rechargeable battery cells. A first rechargeable battery cell includes a first casing, and a second rechargeable battery cell includes a second casing. The first casing and the second casing have different wall thicknesses, at least in sections.

DESCRIPTION OF THE PREFERRED EMBODIMENTS

Figure 1:
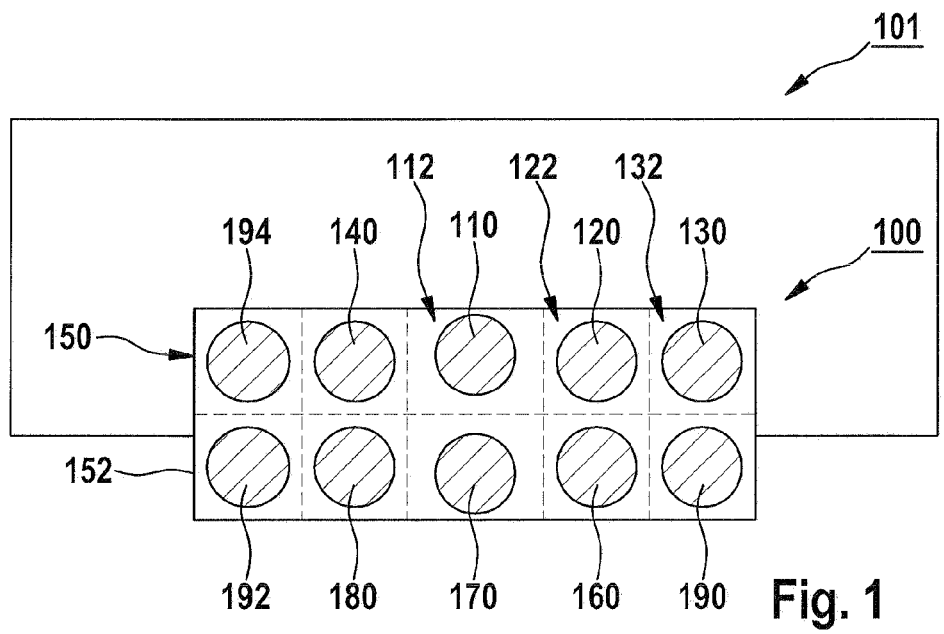
FIG. 1 shows a first embodiment of a rechargeable battery according to the present invention.

FIG. 1 shows a rechargeable battery 100 that is preferably suitable for supplying power to a schematically depicted power tool 101, rechargeable battery 100 including a plurality of rechargeable battery cells 110, 120, 130, 140, 160, 170, 180, 190, 192, 194 which are located in a rechargeable battery housing 150, and are interconnected to form a pack or module. Rechargeable battery cells 110, 120, 130, 140, 160, 170 180 190, 192, 194 may be any type of rechargeable battery, such as NiCd, NiMh, and Li ion.

It is pointed out, however, that the use of a rechargeable battery 100 to supply power to power tool 101 is described merely as an example, and that the use of rechargeable battery 100 is not restricted to this application. Instead, rechargeable battery 100 may be used in many different types of devices, e.g. in a stationary energy accumulator, or in an energy accumulator in motor vehicles. Modifications and variations of this type and further types are possible within the scope of the present invention.

Rechargeable battery housing 150 has an outer housing wall 152 and is filled in its interior, at least partially, with a filler material, e.g., plastic. This filler material encloses rechargeable battery cells 110, 120, 130, 140, 160, 170, 180, 190, 192, 194 at least in sections, and preferably completely, except for the end faces. For example, rechargeable battery cell 110 includes a casing 112 which is indicated as a dashed line, rechargeable battery cell 120 includes a casing 122 which is indicated as a dashed line, and rechargeable battery cell 130 includes a casing 132 which is indicated as a dashed line.

It is pointed out that, in conventional methods used to manufacture rechargeable batteries, in the case of which rechargeable battery cells are enclosed in a rechargeable battery housing made of plastic, the housing is typically filled with the plastic via injection molding. Therefore, each rechargeable battery cell is not enclosed separately in a plastic casing. Instead, all of the rechargeable battery cells are embedded in a one-pieced plastic block. Within the context of the present invention, the term "casing" therefore refers not only to a sleeve that is situated or installed directly on a rechargeable battery cell, but also to a section of a one-pieced plastic block or filler material of this type that encloses a rechargeable battery cell directly and is therefore assigned thereto or may be visually assigned thereto; in the broadest sense, the term "casing" also refers to partitions between rechargeable battery cells.

According to one embodiment of the present invention, at least two of the casings of rechargeable battery cells 110, 120, 130, 140, 160, 170, 180, 190, 192, 194 have different wall thicknesses, at least in sections. As shown in FIG. 1, casings 112 and 132, for example, have different wall thicknesses. These different wall thicknesses are preferably specified such that an essentially homogeneous temperature distribution is attained in the interior of rechargeable battery housing 150 during operation of rechargeable battery 100.

In FIG. 1, all rechargeable battery cells 110, 120, 130, 140, 160, 170, 180, 190, 192, 194 are located within the region of outer housing wall 152, and they are surrounded by directly-adjacent rechargeable battery cells in the interior of the housing.

For example, rechargeable battery cell 110 has five directly-adjacent rechargeable battery cells, i.e. cells 120, 140, 160, 170 and 180. Rechargeable battery cell 130, however, has only three directly-adjacent rechargeable battery cells, i.e. cells 120, 160 and 190

Since rechargeable battery cells are also heated up by rechargeable battery cells adjacent to them, it must be assumed that, e.g. rechargeable battery cell 110 is heated up to a greater extent during operation of rechargeable battery 100 than is rechargeable battery cell 130 which has two fewer cells adjacent to it. For this reason, casing 112 has a greater wall thickness at least in the region between rechargeable battery cell 110 and directly-adjacent rechargeable battery cells 120, 140, 160, 170, 180 than does casing 132 in the region between rechargeable battery cell 130 and rechargeable battery cells 120, 160, 190 situated directly adjacent thereto. This greater wall thickness reduces the extent to which rechargeable battery 110 is heated up by adjacent cells 120, 140, 160, 170, 180. Therefore, the maximum possible temperature that rechargeable battery cell 110 may reach during operation of rechargeable battery 100 is reduced, thereby preventing cell 110 from ageing too rapidly, and preventing local overheating.

As shown in FIG. 1, in the case of rechargeable battery 100, all rechargeable battery cells 110, 120, 130, 140, 160, 170, 180, 190, 192, 194 are situated, e.g. the same distance away from outer housing wall 152, and/or their casings have essentially the same wall thicknesses in the edge region of rechargeable battery housing 150. Even though the measures described above prevent inner rechargeable battery cells 110, 170 from becoming overheated, outer rechargeable battery cells 130, 190, 192, 194 cool off more rapidly since they have fewer directly-adjacent cells and a larger casing surface area which faces outer housing wall 152.

Figure 2:
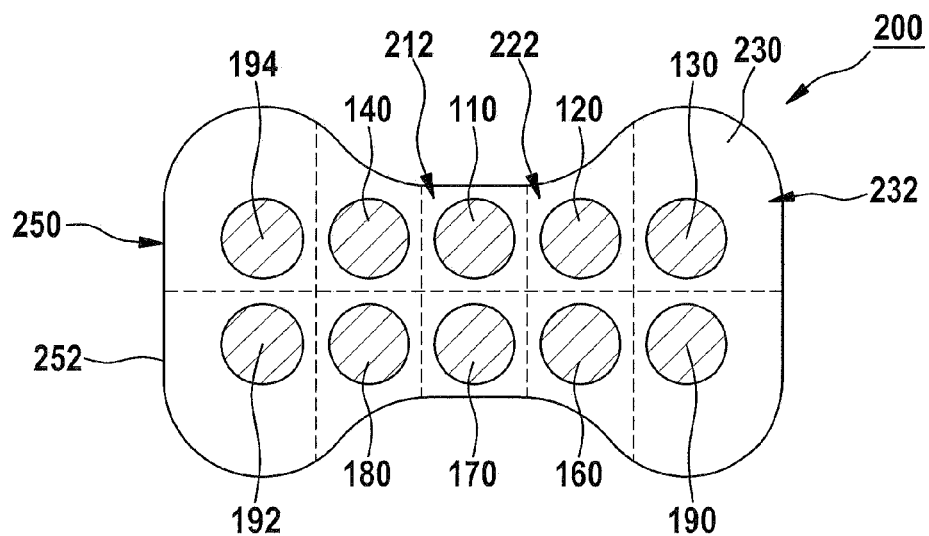
FIG. 2 shows a second embodiment of a rechargeable battery according to the present invention.

FIG. 2 shows a rechargeable battery 200 which is preferably suitable for use to supply power to a power tool, e.g. power tool 101 shown in FIG. 1, and which is shown in a further embodiment which represents a modification of rechargeable battery 100 depicted in FIG. 1. In the case of rechargeable battery 200, all rechargeable battery cells 110, 120, 130, 140, 160, 170, 180, 190, 192, 194 are located in a rechargeable battery housing 250 which includes an outer housing wall 252. Similar to rechargeable battery housing 150 shown in FIG. 1, the interior of rechargeable battery housing 250 is preferably filled with plastic; as a result, rechargeable battery cell 110 includes a casing 212 which is indicated as a dashed line, rechargeable battery cell 120 includes a casing 222 which is indicated as a dashed line, and rechargeable battery cell 130 includes a casing 232 which is indicated as a dashed line. These casings may be designed as described with reference to FIG. 1, or, as an alternative, they may have approximately identical wall thicknesses at least in the regions between rechargeable battery cells 110, 120, 130, 140, 160, 170, 180, 190, 192, 194.

In the embodiment shown in FIG. 2, casing 232 of rechargeable battery cell 130 which is located in the region of outer housing wall 252 includes a ridge-like expansion 230 which is preferably located in the region between rechargeable battery cell 130 and outer housing wall 252. Rechargeable battery cells 190, 192, 194 may include similar ridge-like expansions, as shown in FIG. 2. In the context of the present invention, the term "ridge-like expansion" refers to a voluminous shaping, bulge, or thickening.

Ridge-like expansion 230 is designed to prevent excessive cooling of rechargeable battery cell 130 during operation of rechargeable battery 200. Rechargeable battery cell 130 therefore remains warmer, thereby making it possible to attain a more homogeneous temperature distribution in rechargeable battery 200. As a result, rechargeable battery cells 110, 170 located in the housing interior do not age disproportionately faster than do outer rechargeable battery cells 130, 190, 192, 194, and the service lives of individual rechargeable battery cells 110, 120, 130, 140, 160, 170, 180, 190, 192, 194 are attuned to one another.

As shown in FIG. 2, it is possible for the casing of rechargeable battery cells 110, 170, e.g. casing 212 which is located in the housing interior, to have a smaller wall thickness in the region between assigned rechargeable battery cell 110 and outer housing wall 252 than do the ridge-like expansions, e.g. expansion 230. The heat generated by cells 110, 170 may therefore be dissipated better and more rapidly to the surroundings, thereby making it possible to equalize the temperatures of the inner and outer rechargeable battery cells, and therefore, to attain a more homogeneous temperature distribution. The homogenization of the temperature distribution may be improved further by designing the distances between individual rechargeable battery cells 110, 120, 130, 140, 160, 170, 180, 190, 192, 194, and/or the wall thickness of their casings in the region between the individual cells, in the manner described with reference to FIG. 1. The result of this is an extension of the service life of rechargeable battery 200.

Figure 3:
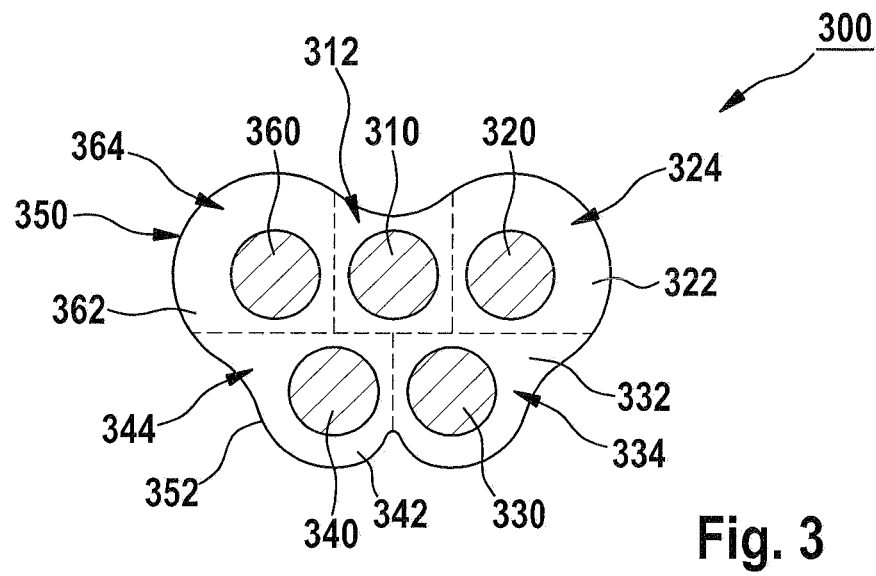
FIG. 3 shows a third embodiment of a rechargeable battery according to the present invention.

FIG. 3 shows a rechargeable battery 300 according to a further embodiment, which is preferably suitable for supplying power to a power tool, e.g. power tool 101 shown in FIG. 1 which includes separate rechargeable battery cells 310, 320, 330, 340, 360 which are located in a rechargeable battery housing 350 having an outer housing wall 352, and which are interconnected to form a pack or module. They include assigned casings 312, 322, 332, 342, 362 which are manufactured by filling housing 350 with plastic, as described with reference to FIGS. 1 and 2. Casings 322, 332, 342, 362 include ridge-like expansions 324, 334, 344, 364.

Since rechargeable battery cell 310, having four adjacent cells, has the greatest number of directly-adjacent rechargeable battery cells, i.e. cells 320, 330, 340, 360, it may heat up to the greatest extent during operation of rechargeable battery 300. For this reason, casing 312 which faces outer housing wall 352 has a small wall thickness.

Rechargeable battery cells 330, 340 each have three adjacent cells, i.e. cells 310, 320, 340 and 310, 330, 360. Therefore, casings 332, 342 which face outer housing wall 352 include ridge-like expansions 334, 344 having a wall thickness which is preferably greater than corresponding wall thickness of casing 312.

Rechargeable battery cells 320, 360 each have only two adjacent cells, i.e. cells 310, 330, and 310, 340. Therefore, casings 322, 362 which face outer housing wall 352 include ridge-like expansions 324, 364 having a wall thickness which is preferably greater than corresponding wall thickness of ridge-like expansions 334, 344, and, therefore, the greatest wall thickness in rechargeable battery 300.

Figure 4:
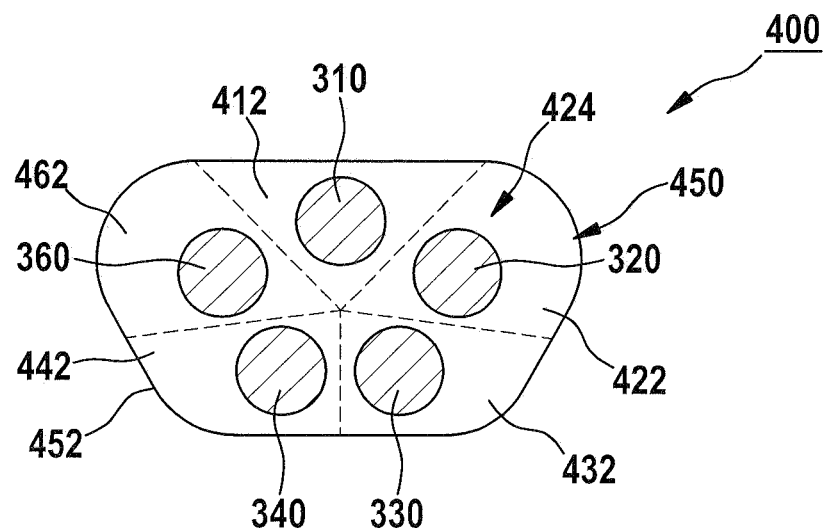
FIG. 4 shows a fourth embodiment of a rechargeable battery according to the present invention.

FIG. 4 shows a rechargeable battery 400 which is preferably suitable for use to supply power to a power tool, e.g. power tool 101 shown in FIG. 1, and which is shown in a further embodiment which represents a modification of rechargeable battery 300 depicted in FIG. 3. In the case of rechargeable battery 400, rechargeable battery cells 310, 320, 330, 340, 360 include assigned casings 412, 422, 432, 442, 462 which may also have ridge-like expansions as is the case with casings 312, 322, 332, 342, 362 shown in FIG. 3. For example, casing 422 includes a ridge-like expansion 424.

Compared to rechargeable battery 300, rechargeable battery cell 310 in rechargeable battery 400 shown in FIG. 4 is displaced upwardly, in order to reduce the extent to which cell 310 is heated up by rechargeable battery cells 330, 340 during operation of rechargeable battery 400. Conversely, an undesired heating-up of cells 330, 340 by rechargeable battery cell 310 during operation of rechargeable battery 400 is prevented. It is therefore easily possible to attain an essentially homogeneous temperature distribution in rechargeable battery 400, thereby making it possible to realize an extended service life and improved operational safety.

It will be understood that each of the elements described above, or two or more together, may also find a useful application in other types of constructions differing from the types described above.

While the invention has been illustrated and described as embodied in a rechargeable battery, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A rechargeable battery, comprising a rechargeable battery housing filled at least partially with a filler material, said rechargeable battery housing including an outer housing wall;

a plurality of rechargeable battery cells situated in an interspaced manner in said rechargeable battery housing so that the filler material encloses said rechargeable battery cells to form casings, said rechargeable battery cells including a first rechargeable battery cell having a first casing and a second rechargeable battery cell having a second casing, said first casing and said second casing having different wall thicknesses, at least in sections, wherein said second casing comprises ridge-like expansions in a region directed towards the outer housing wall, wherein said first rechargeable battery cell is surrounded by a greater number of directly-adjacent rechargeable battery cells than surrounds said second rechargeable battery cell and wherein said first casing has a smaller wall thickness in the region directed towards the outer housing wall than said second casing comprising said ridge-like expansions in a region directed towards the outer housing wall.

2. The rechargeable battery as defined in claim 1, wherein said first and second casings are configured to bring about an essentially homogeneous temperature distribution in an interior of said rechargeable battery housing during operation of the rechargeable battery.

3. The rechargeable battery as defined in claim 1, wherein said first casing in a region between said first rechargeable battery cell and at least a portion of the rechargeable battery cells directly adjacent thereto, having a greater wall thickness than does said second casing in a region between said second rechargeable battery cell and the rechargeable battery cells located directly adjacent thereto.

4. The rechargeable battery as defined in claim 1, wherein said second rechargeable battery cell is located in a region of said outer housing wall, said second casing including a ridge-like expansion in a region between said second rechargeable battery cell and said outer housing wall.

5. The rechargeable battery as defined in claim 4, wherein said first casing has a smaller wall thickness in a region between said first rechargeable battery cell and said outer housing wall than does said ridge-like expansion.

6. The rechargeable battery cell as defined in claim 1, wherein said filler material which at least partially fills said rechargeable battery housing is composed of plastic.

7. A power tool, comprising a rechargeable battery that includes a rechargeable battery housing filled at least partially with a filler material, said rechargeable battery housing including an outer housing wall, a plurality of rechargeable battery cells situated in an interspaced manner in said rechargeable battery housing so that the filler material encloses said rechargeable battery cells to form casings, said rechargeable battery cells including a first rechargeable battery cell having a first casing and a second rechargeable battery cell having a second casing, said first casing and said second casing having different wall thicknesses, at least in sections, wherein said second casing comprises ridge-like expansions in a region directed towards the outer housing wall, wherein said first rechargeable battery cell is surrounded by a greater number of directly-adjacent rechargeable battery cells than surrounds said second rechargeable battery cell and wherein said first casing has a smaller wall thickness in the region directed towards the outer housing wall than said second casing comprising said ridge-like expansions in a region directed towards the outer housing wall.

* * * * *